(12) United States Patent
Malaya et al.

(10) Patent No.: US 11,640,711 B2
(45) Date of Patent: May 2, 2023

(54) AUTOMATED ARTIFACT DETECTION

(71) Applicants: Advanced Micro Devices, Inc., Santa Clara, CA (US); ATI Technologies ULC, Markham (CA)

(72) Inventors: Nicholas Malaya, Austin, TX (US); Max Kiehn, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 177 days.

(21) Appl. No.: 17/030,250

(22) Filed: Sep. 23, 2020

(65) Prior Publication Data

US 2021/0383527 A1     Dec. 9, 2021

Related U.S. Application Data

(60) Provisional application No. 63/035,625, filed on Jun. 5, 2020.

(51) Int. Cl.
*G06T 7/00* (2017.01)
*G06K 9/62* (2022.01)
*G06V 20/40* (2022.01)

(52) U.S. Cl.
CPC .......... *G06T 7/0002* (2013.01); *G06K 9/6256* (2013.01); *G06K 9/6262* (2013.01); *G06V 20/40* (2022.01); *G06T 2207/10016* (2013.01); *G06T 2207/20081* (2013.01)

(58) Field of Classification Search
None
See application file for complete search history.

(56) References Cited

U.S. PATENT DOCUMENTS

| | | | |
|---|---|---|---|
| 2018/0075581 A1 | 3/2018 | Shi et al. | |
| 2019/0128989 A1 | 5/2019 | Braun et al. | |
| 2019/0130221 A1 | 5/2019 | Bose et al. | |
| 2019/0259134 A1 | 8/2019 | Rainy | |
| 2019/0385018 A1 | 12/2019 | Ngo Dinh et al. | |
| 2021/0125036 A1* | 4/2021 | Tremblay | G06N 3/08 |
| 2021/0374947 A1* | 12/2021 | Shin | G06N 3/0454 |
| 2021/0383557 A1* | 12/2021 | Brauer | G06T 7/32 |

* cited by examiner

*Primary Examiner* — Vikkram Bali
(74) *Attorney, Agent, or Firm* — Volpe Koenig

(57) ABSTRACT

A technique for generating a trained discriminator is provided. The technique includes applying one or more of a glitched image or an unglitched image to a discriminator; receiving classification output from the discriminator; adjusting weights of the discriminator to improve classification accuracy of the discriminator; applying noise to a generator; receiving an output image from the generator; applying the output image to the discriminator to obtain a classification; and adjusting weights of one of the discriminator or the generator to improve ability of the generator to reduce classification accuracy of the discriminator, based on the classification.

20 Claims, 4 Drawing Sheets

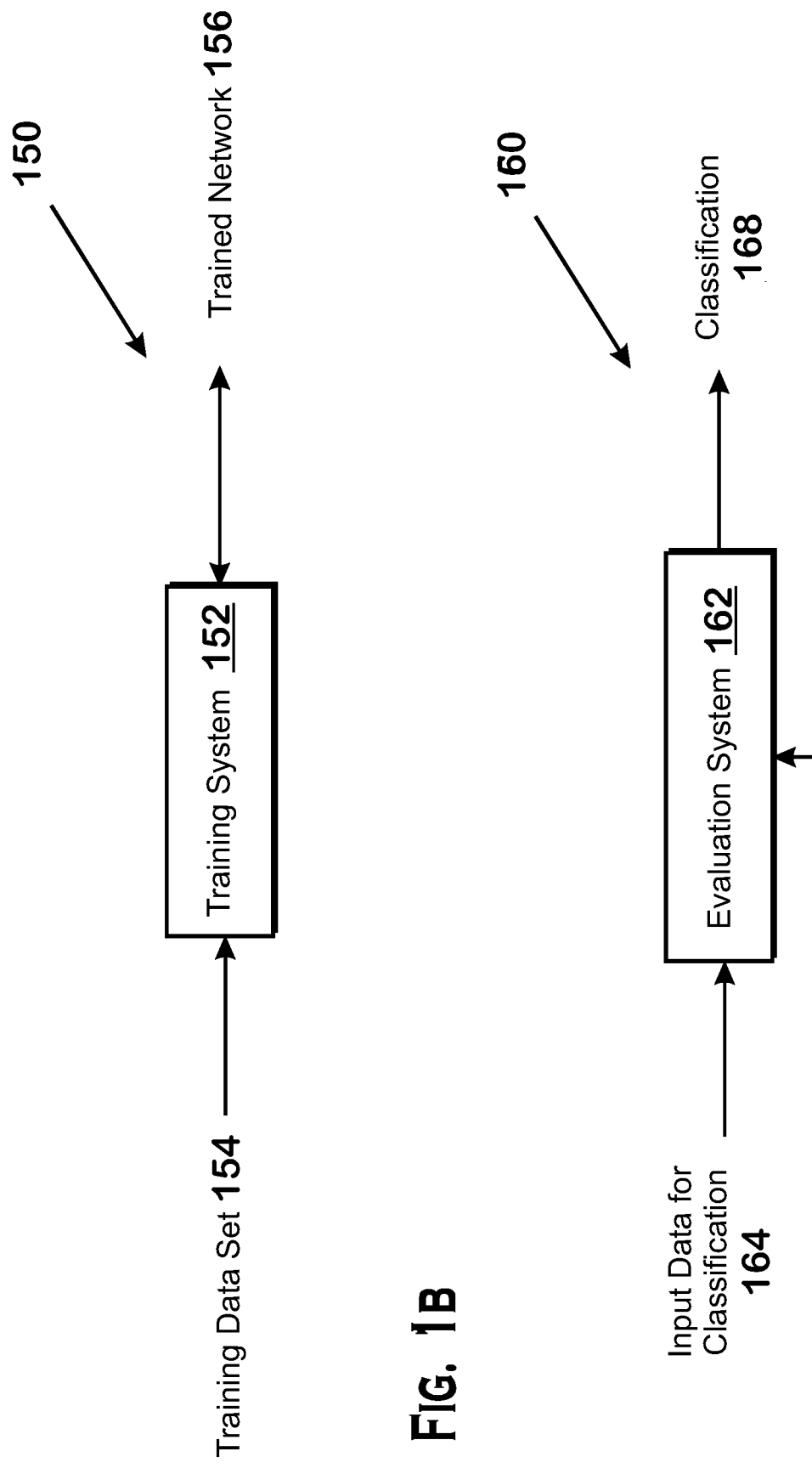

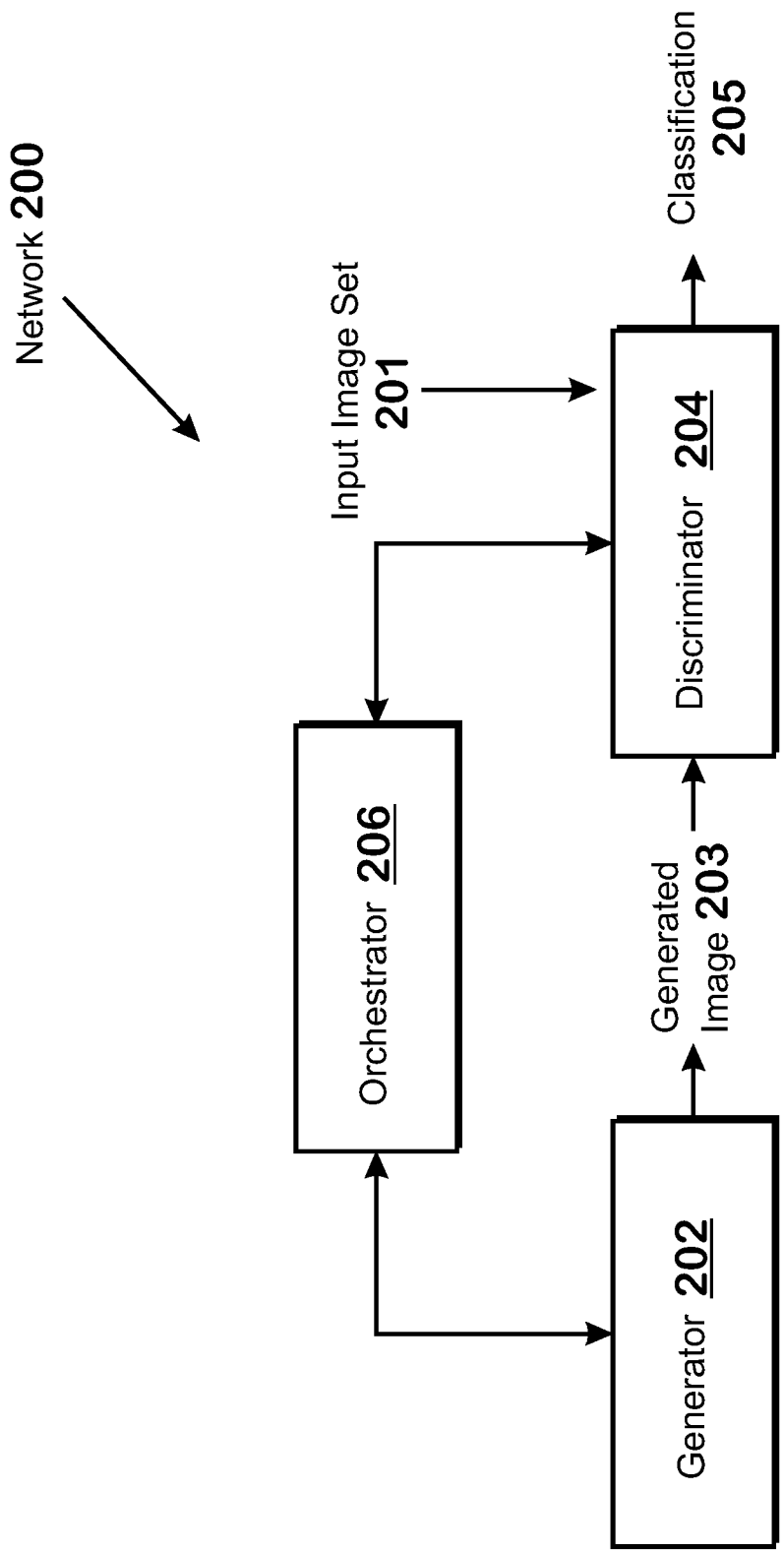

AUTOMATED ARTIFACT DETECTION

CROSS-REFERENCE TO RELATED APPLICATIONS

This application claims the benefit of U.S. Provisional application No. 63/035,625, entitled "AUTOMATED ARTIFACT DETECTION," filed on Jun. 5, 2020, the entirety of which is hereby incorporated herein by reference.

BACKGROUND

Video, such as the sequence of frames generated by a video game, sometimes include glitches. No known automated system is capable of detecting whether such video includes glitches.

BRIEF DESCRIPTION OF THE DRAWINGS

A more detailed understanding can be had from the following description, given by way of example in conjunction with the accompanying drawings, wherein:

FIG. 1B illustrates a training device according to an example;

FIG. 1C illustrates an evaluation device that includes an evaluation system for producing a classification for input data based on a trained network, according to an example;

FIG. 2 illustrates a network for training a generator and discriminator to generate glitched and un-glitched images and to classifying images having or not having a glitch, according to an example;

DETAILED DESCRIPTION

A technique for generating a trained discriminator is provided. The technique includes applying one or more of a glitched image or an unglitched image to a discriminator; receiving classification output from the discriminator; adjusting weights of the discriminator to improve classification accuracy of the discriminator; applying noise to a generator; receiving an output image from the generator; applying the output image to the discriminator to obtain a classification; and adjusting weights of one of the discriminator or the generator to improve ability of the generator to reduce classification accuracy of the discriminator, based on the classification.

Figure 1A:
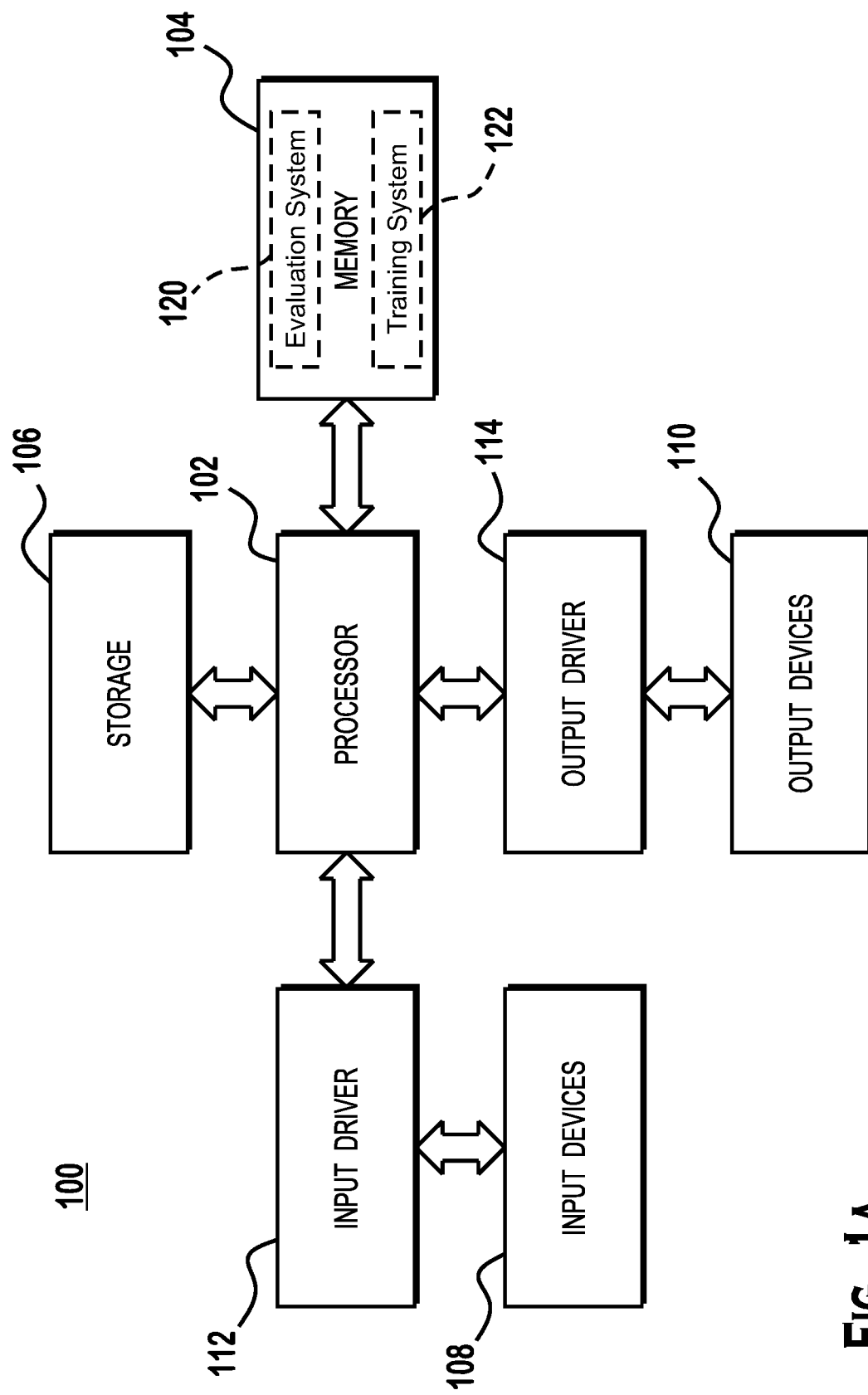
FIG. 1A is a block diagram of an example computing device in which one or more features of the disclosure can be implemented.

FIG. 1A is a block diagram of an example computing device 100 in which one or more features of the disclosure can be implemented. The computing device 100 could be one of, but is not limited to, for example, a computer, a gaming device, a handheld device, a set-top box, a television, a mobile phone, a tablet computer, or other computing device. The device 100 includes one or more processors 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1A.

In various alternatives, the one or more processors 102 include a central processing unit (CPU), a graphics processing unit (GPU), a CPU and GPU located on the same die, or one or more processor cores, wherein each processor core can be a CPU or a GPU. In various alternatives, the memory 104 is located on the same die as one or more of the one or more processors 102, or is located separately from the one or more processors 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that interface with and drive input devices 108 and output devices 110, respectively. The input driver 112 communicates with the one or more processors 102 and the input devices 108, and permits the one or more processors 102 to receive input from the input devices 108. The output driver 114 communicates with the one or more processors 102 and the output devices 110, and permits the one or more processors 102 to send output to the output devices 110.

In various implementations, the device 100 includes one or both of an evaluation system 120 and a training system 122. The evaluation system 120 is capable of detecting graphical anomalies ("glitches") in images such as those produced by video games. The training system 122 trains one or more machine learning components (sometimes referred to as "classifiers") of a network of the evaluation system 120 to recognize glitches.

Some implementations of the device 100 include a computer system configured to train one or more of the machine learning components. Some such implementations include a computer system such as a server or other computer system associated with a server or server farm, where the computer system generates one or more trained classifiers. In some implementations, the computer system that generates one or more trained classifiers also uses the trained classifiers to evaluate whether input images include or do not include a glitch. Other implementations of the device 100 include a computer system (such as a client) that is configured to store a trained network (generated by a different computer system) and to evaluate input data (e.g., an image) through the trained network to determine whether the input data includes a glitch. Thus, the device 100 generically represents the architecture of one or more computer systems that generate the trained network and use the trained network to determine whether one or more images includes a glitch.

FIG. 1B illustrates a training device 150 according to an example. In some implementations, the training device 150 is implemented as the device 100 of FIG. 1A, with the training system 152 being software, hardware, or a combination thereof for performing the operations described herein. The training system 152 accepts a training data set 154 and trains a trained network 156. The training data set 154 includes a plurality of images that assist with training the trained network 156. The training system 152 trains the trained network 156 based on the training data set 154 to recognize whether subsequent input images include or do not include glitches. In some examples, the trained network 156 includes a generative adversarial network as described in further detail herein.

FIG. 1C illustrates an evaluation device 160 that includes an evaluation system 162 for producing a classification 168 for input data 164 based on a trained network 166 (which, in some implementations, is a trained network 156 generated by a training system 152), according to an example. The classification 168 includes an indication of whether the image of the input data 164 includes or does not include a glitch. Sometimes, the word "defect" replaces the word "glitch" herein. In some examples, the evaluation system 162 alternatively or additional generates outputs indicating which type or types of glitches exist in the input data 164.

As described above, the training system 152 implements a generative adversarial network. The generative adversarial network uses adversely acting generator and discriminator components combined with back propagation to improve the performance of both such components. The training system 152 improves the ability of the generator to convincingly generate images deemed to be either glitched or normal. The training system 152 also improves the ability of the discriminator to determine whether the output images from the generator are glitched or not glitched.

Because the discriminator is able to determine whether images are glitched or not, the evaluation system 162 utilizes the discriminator generated by the training system 152 in determining whether the input data for classification 164 is deemed to contain a glitch or not.

FIG. 2 illustrates a network 200 for training a generator 202 and discriminator 204 to generate glitched and un-glitched images and to classifying images having or not having a glitch, according to an example. The network 200 includes a generator 202 and a discriminator 204, which together form a generative adversarial network ("GAN"). The generator 202 generates a generated image 203 based on input noise (not shown—the input noise is generated in any technically feasible manner, such as via a random number generator) and the discriminator attempts to classify the generated image 203 as either normal or containing a defect ("glitch"). The orchestrator 206 orchestrates training of the network 200.

The orchestrator 206 trains the discriminator using an input image set 201 which includes a set of images that either have glitches or do not have glitches. The specific images included within the input image set 201 depend on the exact training scheme used. Various training schemes are discussed elsewhere herein.

The orchestrator 206 trains the network 200 by providing noise to the generator 202, which outputs generated images 203. The orchestrator 206 causes the discriminator 204 to output a classification 205 that indicates whether the generated image 203 includes or does not include a glitch. The orchestrator 206 trains the discriminator 204 to accurately classify the input image set 201 (i.e., as either including a glitch if the input image set 201 includes only glitched images or as not including a glitch if the input image set 201 does not include any glitched images), and to accurately classify the generated images 203. The orchestrator 206 trains the generator 202 to "fool" the discriminator 204, by maximizing the error rate of the discriminator 204. Thus the orchestrator 206 continually improves the ability of the generator 202 to generate "realistic" images, and improves the ability of the discriminator 204 to accurately classify an image as including either a glitch or not including a glitch. In some implementations, the discriminator 204 is a convolutional neural network. In some implementations, the generator 202 is a deconvolutional neural network.

As stated above, the initial input image set 201 includes images that either include or do not include glitches. Some example glitches include shader artifacts, shape artifacts, discoloration artifacts, a morse code pattern, dotted line artifacts, parallel lines, triangulation, line pixelization, screen stuttering, screen tearing, square patch artifacts, blurring artifacts, and random patch artifacts.

Shader artifacts include visible artifacts related to improper shading. A "shader program" is a program that executes on a graphics processing unit to perform functions such as transforming vertex coordinates ("vertex shader programs") and coloring pixels ("pixel shader programs"). A shader artifact occurs when one or more polygons are improperly shaded. Instances of such improper shading appear visually in an image as polygonal shapes of different colors that either blend together or display gradual fading in certain directions.

Shape artifacts are artifacts in which random polygonal monocolor shapes appear in an image. Discoloration artifacts are artifacts in which bright spots colored differently than expected exist in the image. A morse code pattern appears when memory cells of a graphics card become stuck and result in those stuck values being displayed rather than the true image being displayed. In various examples, a GPU running at a higher speed than what the GPU was designed for, or at a higher temperature than the GPU was designed for, results in the morse code pattern.

A dotted line artifact typically involves dotted lines having random slopes and positions or radial lines emanating from a single point. Parallel line artifacts include lines that are parallel, have a uniform color, and are not part of the true image. A triangulation artifact appears as a grid of triangles throughout the image, where a smoother, more natural image is actually correct. Line pixelations are characterized as stripes (such as horizontal stripes) having random colors in an image. Screen stuttering occurs when neighboring columns and rows of an image are swapped with each other. Screen tearing occurs as two consecutive frames in a video that are rendered in the same image. Part of the image is the scene at one point in time and another part of the image is the scene at a different point in time.

A square patch artifact is a square patch of uniform or nearly uniform color that anomalously appears in an image. A blurring artifact is a blurring in a portion of an image that should appear in focus. A random patch artifact is a randomly shaped patch of uniform or nearly uniform color that anomalously appears in an image.

The phrase "deemed to include a glitch" is sometimes replaced with "includes a glitch" herein and means that the discriminator 204 labels an image as including a glitch. Similarly, a phrase such as "deemed to not include a glitch" is sometimes replaced with "does not include a glitch" and means that the discriminator 204 labels a generated image 203 as not including a glitch.

Referring to FIGS. 1B and 2 together, in some implementations, the trained network 166 that the evaluation system 162 uses to classify input data for classification 164 is the discriminator 204 generated by the network 200 of FIG. 2. In an example, a server or other system includes or is the training system 152. The server performs training to generate the discriminator 204 and transmits the discriminator 204 to an evaluation system 162. The evaluation system uses the discriminator 204 as a trained network 166 for evaluating input data to generate a classification 168. Specifically, the evaluation system inputs images to the trained discriminator 204 to generate an output classification that either indicates or does not indicate that the images include a glitch.

Figure 3A:
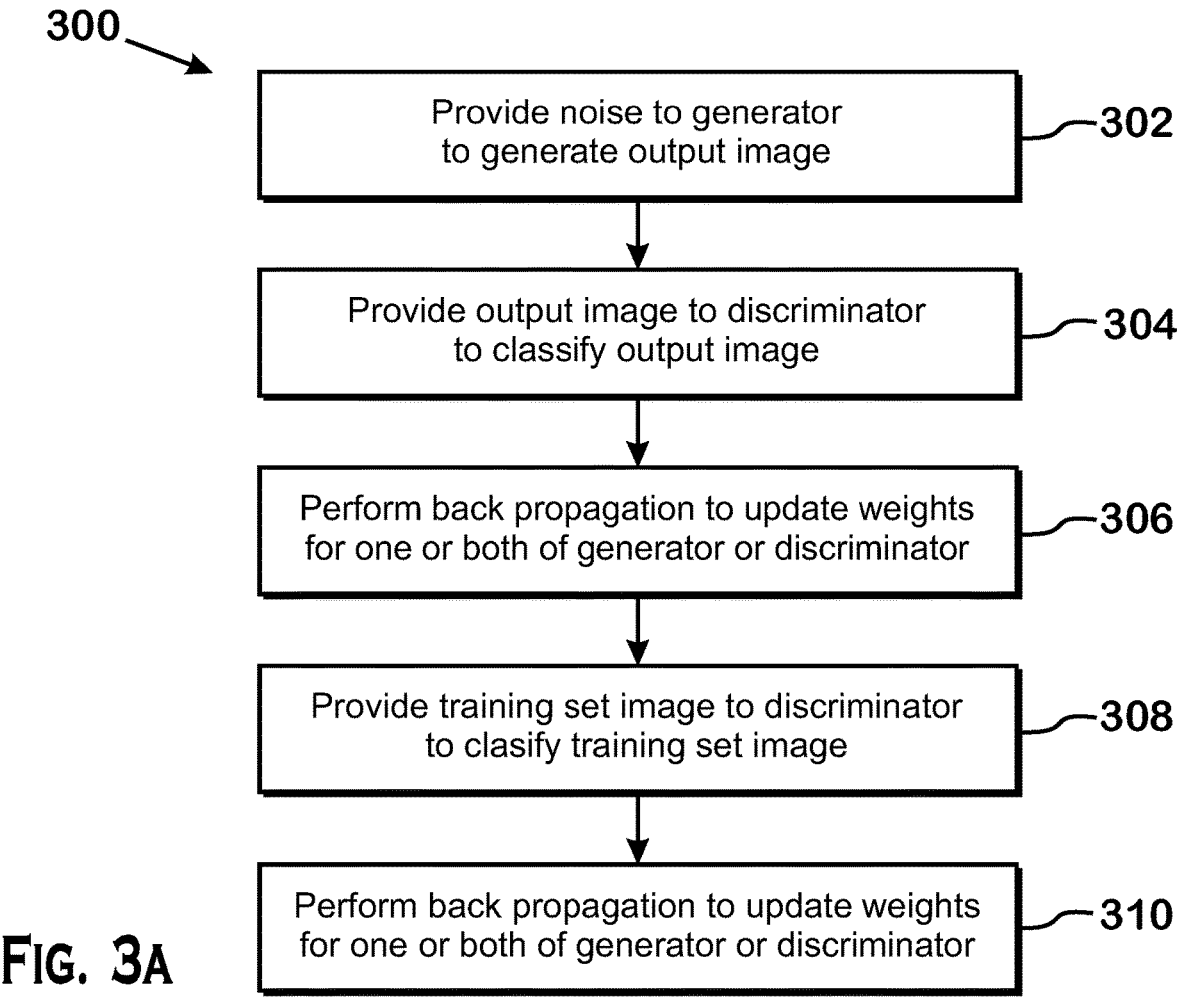
FIG. 3A is a flow diagram of a method generating a classifier for classifying an image as either containing or not containing a glitch.

FIG. 3A is a flow diagram of a method 300 generating a classifier for classifying an image as either containing or not containing a glitch. Although described with respect to the systems of FIGS. 1A-2, any system configured to perform the steps of the method 300 in any technically feasible order falls within the scope of the present disclosure.

The method 300 begins at step 302, where an orchestrator 206 provides noise to a generator 202 to generate an output image. As described elsewhere herein, the generator 202 is a neural network configured to generate an image from noise. In an example, the generator 202 is a deconvolutional neural network.

At step 304, the orchestrator 206 provides the output image to a discriminator 204 to classify the output image. The discriminator 204 is capable of classifying images as either including a glitch or not including a glitch. As will be described in further detail below, the types of images in the training set 201 determines how the images from the training set 201 and images generated by the generator 202 map to "glitched" or "unglitched" images. In general, the term "fake" is used to denote images generated by the generator 202 and the term "real" is used to denote images provided as the training set 201. Again, the specific way in which images that are considered "glitched" or "unglitched" maps to "fake" or "real" images depends on the specific configuration of the discriminator 204 and generator 202. Several such ways are described in more detail below.

At step 306, the orchestrator 206 performs back propagation to update weights for one or both of the generator 202 or discriminator 204. In some implementations, during each "pass," where a "pass" means one instance of providing noise to generate an output image (302) and providing an image to generate a classification (304), the weights of one of the discriminator 204 or generator 202 are adjusted, but the weights of the other of the discriminator 204 or generator 202 are not adjusted. In other words, during a single pass, the weights of one of the discriminator 204 or the generator 202 are held constant. Back propagation for the discriminator 204 involves adjusting the weights to minimize error with relation to the actual classification of the image, where the classification is based on whether the image is generated by the generator ("fake") or is an input image 201. In other words, back-propagation for the discriminator 204 attempts to maximize the accuracy with which the discriminator 204 can identify whether an image is generated by the generator 202 or is provided as an input image 201. Back-propagation for the generator 202 involves maximizing the classification error of the discriminator 204. In other words, for the generator 202, back propagation attempts to increase the chance that the discriminator 204 will improperly label a "real" image as "fake" or a "fake" image as "real."

At step 308, the orchestrator 206 provides a training set image 201 to the discriminator 204 to classify the training set image 201. As with images from the generator 202, the discriminator 204 processes an image through the neural network of the discriminator 204 to generate a classification classifying an image as either "real" or "fake." At step 310, the orchestrator 206 performs back-propagation, as described above, to update the weights of the generator 202 or discriminator 204.

It should be understood that in some examples, there are three different types of passes: one in which a real image is provided to the discriminator 204 and the discriminator 204 attempts to correctly classify the image, after which back-propagation is applied to the discriminator 204; one in which the generator 202 generates an image classified by the discriminator 204 and back-propagation is applied to the generator 202; and one in which the generator 202 generates an image classified by the discriminator 204 and back-propagation is applied to the discriminator 204. Any of these types of passes can be executed in any desired sequence. In an example, these three types of passes alternate, such that each different types are performed one after the other. In other examples, the three different types are clumped or batched together and these batches are processed through the generator 202 and discriminator 204.

In various examples, the generator 202 and discriminator 204 are capable of being implemented in one of several different ways. In one example, the training set 201 includes real images, none of which have glitches. The discriminator 204 classifies an image received from the generator 202 or a "real" image received as part of the training set 201 as either real and thus unglitched, or fake, and thus glitched. In this example, the "real" images are mapped to "unglitched" images and the "fake" images are mapped to "glitched" images. In another example, the training set 201 includes real images, all of which have glitches. In this example, the "real" images are mapped to "glitched" images and the "fake" image are mapped to "unglitched" images.

In another example, the discriminator 204 is trained to recognize multiple types of real and fake images. In one example, the discriminator 204 is trained to recognize real and fake glitched images as well as real and fake unglitched images. In this instance, "real" and "fake" images do not directly map to glitched or unglitched. In this example, the generator 202 generates either a glitched image or a real image. The determination of whether to attempt to generate a glitched image or a real image is, in some instances, based on a selection input, which, in some instances, is random. The input set 201 includes both images that are labeled as glitched and images that are labeled as unglitched. In this situation, the discriminator 204 attempts to accurately classify an image as being real (i.e., received from the input set 201) and glitched, real and unglitched, fake (i.e., generated by the generator 202) and glitched, or fake and unglitched. The orchestrator 206 performs back-propagation to increase the ability of the generator 202 to fool the discriminator 204 by causing the discriminator 204 to mis-classify the fake images as real and performs back-propagation to increase the ability of the discriminator 204 to properly classify input images as one of the four categories listed above.

In yet another example, the system includes multiple combinations of discriminators 204 and generators 202, each one tailored to a specific type of glitch. The input images 201 to each such combination includes images having the particular glitch assigned to that combination. The discriminators 204 are trained to properly classify real and fake images of the assigned glitch type and the generators 202 are trained to "fool" the discriminators 204 into mis-classifying the images.

The training set 201 is generated in any technically feasible manner. In an example, one or more people obtain screenshots from real products. Some of these screenshots include glitches and some of these screenshots do not include glitches.

Figure 3B:
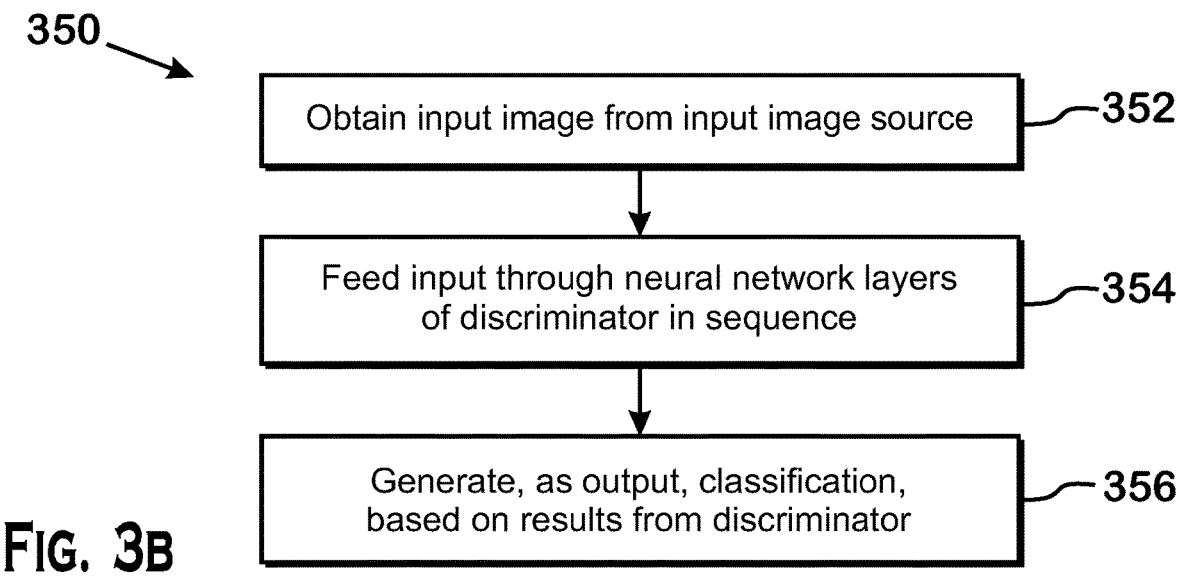
FIG. 3B is a flow diagram of a method for classifying an image as containing a glitch or not containing a glitch, according to an example.

FIG. 3B is a flow diagram of a method 350 for classifying an image as containing a glitch or not containing a glitch, according to an example. Although described with respect to the system of FIGS. 1A-2, those of skill in the art will understand that any system, configured to perform the steps of FIG. 3B, falls within the scope of the present disclosure.

The method 350 begins at step 350, where a trained discriminator 204 receives an input image to classify from an input image source. The input image source is any entity capable of generating an image. In some examples, the input image source is software such as a video game that renders a scene and generates output images for display. In other examples, the input image source is an image from other software or hardware, such as a computer application or a video source.

At step 354, the trained discriminator 204 feeds the input image through the neural network layers of the discriminator in sequence. More specifically, as described elsewhere herein, each neural network layer accepts an input from either a previous layer or an input to the network (e.g., the input image itself), processes that input through the layer, and provides an output either to a subsequent layer or to the output of the network itself (e.g., as a classification). In examples, the discriminator 204 is implemented as a convolutional neural network, which includes one or multiple convolutional layers that perform convolution operations. In various examples, the discriminator 204 also includes other types of operations to perform at various layers in conjunction with or instead of convolution operations.

At step 356, the trained discriminator 204 generates an output classification based on the results from propagation through all the layers. As described above, the specific type of classification depends on how the discriminator 204 was trained. Examples are provided elsewhere herein. In an example, the discriminator 204 is capable of labeling images as either containing a glitch or not containing a glitch. In some examples, the discriminator 204 is capable of indicating which type of glitch is present in an image. In some such examples, the discriminator 204 is actually multiple individual trained discriminators, as described above.

The discriminator 204, generator 202, and/or orchestrator 206 are embodied as software executing on a programmable processor (which is a hardware processor including appropriate circuitry), fixed function hardware circuitry configured to perform the functionality described herein, or a combination of software and hardware.

Any of the various elements of FIGS. 1A-2, such as the training system 152, evaluation system 162, network 200, generator 202, discriminator 204, and orchestrator 206 are, in various implementations, implemented as one of software executing on a processor, hardware that is hard-wired (e.g., circuitry) to perform the various operations described herein, or a combination thereof.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for generating a trained discriminator, the method comprising:
    applying a glitched image and an unglitched image to a discriminator, wherein the glitched image includes at least one of shader artifacts, shape artifacts, discoloration artifacts, a morse code pattern, dotted line artifacts, parallel lines, triangulation, line pixelization, screen stuttering, screen tearing, square patch artifacts, blurring artifacts, or random patch artifacts;
    receiving classification output from the discriminator;
    adjusting weights of the discriminator to improve classification accuracy of the discriminator;
    applying noise to a generator;
    receiving an output image from the generator;
    applying the output image to the discriminator to obtain a classification; and
    adjusting weights of one of the discriminator or the generator to improve ability of the generator to reduce classification accuracy of the discriminator, based on the classification.

2. The method of claim 1, further comprising transmitting the trained discriminator from a computer system that generates the trained discriminator to a different computer system configured to activate the trained discriminator to determine whether an image includes a glitch.

3. The method of claim 2, further comprising:
    classifying one or more images as including a glitch or not including a glitch, at the different computer system.

4. The method of claim 1, wherein:
    the glitched image or the unglitched image is selected from a training set.

5. The method of claim 4, wherein the training set includes all glitched images.

6. The method of claim 4, wherein the training set includes all unglitched images.

7. The method of claim 4, wherein the training set includes glitched and unglitched images, and the discriminator is configured to provide one of four classifications, including real and glitched, real and unglitched, fake and glitched, and fake and unglitched.

8. The method of claim 4, wherein the training set includes images labeled with glitch type.

9. The method of claim 8, further comprising:
providing the training set to a plurality of discriminator-generator pairs, each configured for a different type of glitch.

10. A system for generating a trained discriminator, the system comprising:
an orchestrator;
a generator; and
a discriminator,
wherein the orchestrator is configured to:
apply one or more of a glitched image and an unglitched image to the discriminator, wherein the glitched image includes at least one of shader artifacts, shape artifacts, discoloration artifacts, a morse code pattern, dotted line artifacts, parallel lines, triangulation, line pixelization, screen stuttering, screen tearing, square patch artifacts, blurring artifacts, or random patch artifacts;
receive classification output from the discriminator;
adjust weights of the discriminator to improve classification accuracy of the discriminator;
apply noise to the generator;
receive an output image from the generator;
apply the output image to the discriminator to obtain a classification; and
adjust weights of one of the discriminator or the generator to improve ability of the generator to reduce classification accuracy of the discriminator, based on the classification.

11. The system of claim 10, wherein the orchestrator is further configured to transmit data for the trained discriminator from a computer system that generates the trained discriminator to a different computer system configured to activate the trained discriminator to determine whether an image includes a glitch.

12. The system of claim 11, wherein the different computer system, using the data for the trained discriminator, is configured to:
classify one or more images as including a glitch or not including a glitch.

13. The system of claim 10, wherein:
the glitched image or the unglitched image is selected from a training set.

14. The system of claim 13, wherein the training set includes all glitched images.

15. The system of claim 13, wherein the training set includes all unglitched images.

16. The system of claim 13, wherein the training set includes glitched and unglitched images, and the discriminator is configured to provide one of four classifications, including real and glitched, real and unglitched, fake and glitched, and fake and unglitched.

17. The system of claim 13, wherein the training set includes images labeled with glitch type.

18. The system of claim 17, wherein the orchestrator is further configured to:
provide the training set to a plurality of discriminator-generator pairs, each configured for a different type of glitch.

19. A non-transitory computer-readable medium storing instructions that, when executed by a processor, cause the processor to generate a trained discriminator, by:
applying a glitched image and an unglitched image to a discriminator, wherein the glitched image includes at least one of shader artifacts, shape artifacts, discoloration artifacts, a morse code pattern, dotted line artifacts, parallel lines, triangulation, line pixelization, screen stuttering, screen tearing, square patch artifacts, blurring artifacts, or random patch artifacts;
receiving classification output from the discriminator;
adjusting weights of the discriminator to improve classification accuracy of the discriminator;
applying noise to a generator;
receiving an output image from the generator;
applying the output image to the discriminator to obtain a classification; and
adjusting weights of one of the discriminator or the generator to improve ability of the generator to reduce classification accuracy of the discriminator, based on the classification.

20. The non-transitory computer-readable medium of claim 19, wherein the instructions further cause the processor to transmit the trained discriminator from a computer system that generates the trained discriminator to a different computer system configured to activate the trained discriminator to determine whether an image includes a glitch.

* * * * *